(No Model.)

M. H. CRAM.
DEVICE TO PREVENT HENS FROM SITTING.

No. 365,672. Patented June 28, 1887.

Witnesses
F. L. Ourand
Benj. G. Cowl

Inventor
Merrill H. Cram,
By his Attorneys
Louis Bagger & Co.

N. PETERS, Photo-Lithographer, Washington, D. C.

UNITED STATES PATENT OFFICE.

MERRILL H. CRAM, OF LA CROSSE, WISCONSIN.

DEVICE TO PREVENT HENS FROM SITTING.

SPECIFICATION forming part of Letters Patent No. 365,672, dated June 28, 1887.

Application filed March 19, 1887. Serial No. 231,491. (No model.)

*To all whom it may concern:*

Be it known that I, MERRILL H. CRAM, a citizen of the United States, and a resident of La Crosse, in the county of La Crosse and State of Wisconsin, have invented certain new and useful Improvements in Devices to Prevent Hens from Sitting; and I do hereby declare that the following is a full, clear, and exact description of the invention, which will enable others skilled in the art to which it appertains to make and use the same, reference being had to the accompanying drawings, which form a part of this specification, and in which—

Figure 1:
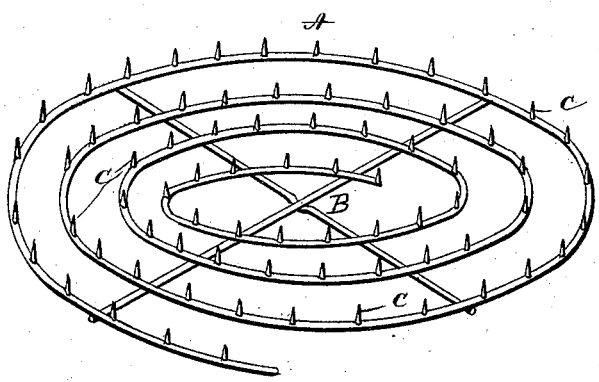
Figure 2:
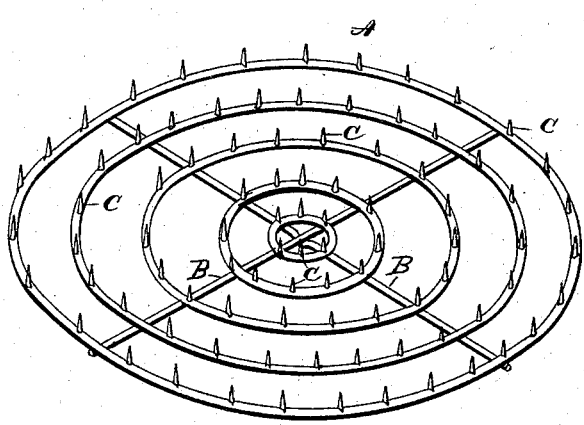

Figure 1 is a perspective view of my improved device, showing the same constructed in a spiral form; and Fig. 2 is a similar view showing the device constructed of a series of rings closely set with the operative spurs or points.

The same letters of reference indicate corresponding parts in both the figures.

My invention consists in a device for preventing hens from sitting, and which also operates to induce or influence the hen to lay another litter of eggs; and my invention will be hereinafter fully described and claimed.

Referring to the several parts by letter, A indicates the wire out of which my invention is usually constructed, especially when made in the spiral or ring form, the wire being curved or bent into either a spiral form, as shown in Fig. 1, or into a series of rings, as shown in Fig. 2, and secured in place by means of the bars B, which can be of any desired or suitable kind of material, I wishing to reserve to myself the right to construct the body of the device of either wood, metal, or any firm or hard substance. The body having been thus constructed of continuous rows or circles and of a size to effectually cover the nest, its rows are provided with a numerous series of sharp-pointed projections, spurs, or points, C, which may be made of any desired hard material, and which are arranged either horizontal, perpendicular, or at any angle, the distance between the said points and the length of the same being regulated as desired.

It will be seen that when one of my improved devices has been secured in operative position in a nest, after the hen has laid one litter of eggs, when the hen attempts to settle down upon the nest for the purpose of sitting, which she usually does after having laid a litter of eggs, she will come in contact with the points C, one of which will be sure to enter her body in such a manner, as will be readily understood, that while driving her off of the nest, and thus preventing her from sitting, it will place her in a condition to lay another litter of eggs soon after. This device has been found by practical experiment to operate successfully in precisely this manner.

From the foregoing description, taken in connection with the accompanying drawings, the construction, operation, and many advantages of my invention will be clearly understood. It will be seen that my invention, while simple and strong in construction, is exceedingly effective and valuable in its operation. It will, in the first place, effectually prevent the hen from sitting, as after having once settled down on the points, as described, the hen will not attempt to sit in any other place, while where the nest is merely filled with a box or other obstruction, as is frequently done, the hen will squat outside of the nest; and, in the second place, my invention, besides driving the hen off the nest and preventing her from sitting, will, operating in the manner above described, instantly divert the hen from any desire or disposition to sit further, thereby placing her in a condition to lay another litter of eggs in a much shorter time than where the old method of confining and starving the hen, heretofore employed, is adopted, thus rendering it an exceedingly valuable invention.

Having thus described my invention, what I claim, and desire to secure by Letters Patent of the United States, is—

The device to prevent hens from sitting, consisting of a curved wire, A, and bars B, for securing and retaining the wire in position, and the sharp spurs or points C, secured to the wire, substantially as shown, and for the purpose set forth.

In testimony that I claim the foregoing as my own I have hereunto affixed my signature in presence of two witnesses.

MERRILL H. CRAM.

Witnesses:
    JNO. DONCHESTSHER,
    LOUIS TILLMAN.